(No Model.) 2 Sheets—Sheet 1.
J. G. PARVIN.
LIME LIGHT APPARATUS.

No. 553,070. Patented Jan. 14, 1896.

WITNESSES
Franck L. Ourand
Joseph Gregory

INVENTOR
John George Parvin,
by Finckel & Finckel,
Attorneys.

(No Model.) 2 Sheets—Sheet 2.
J. G. PARVIN.
LIME LIGHT APPARATUS.
No. 553,070. Patented Jan. 14, 1896.
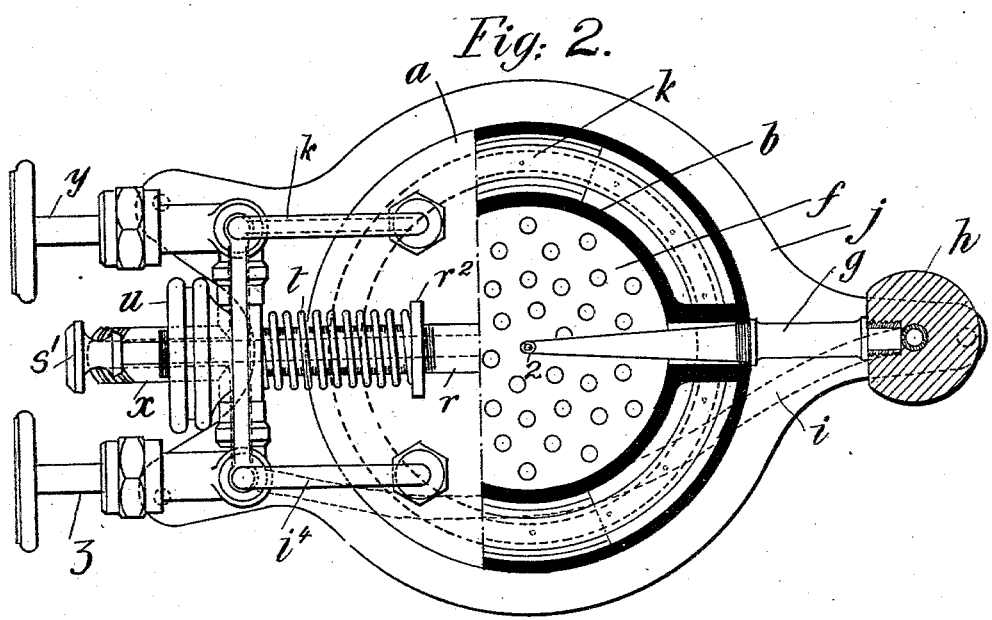
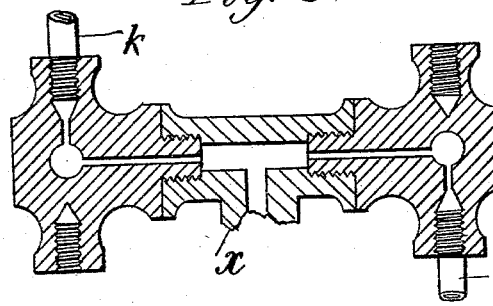
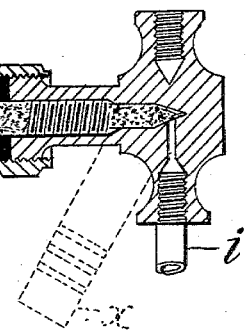
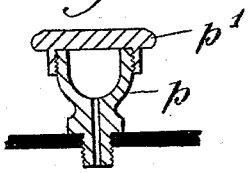
WITNESSES
Franck L. Durand
Joseph Gregory
INVENTOR
John George Parvin,
by Finckel + Finckel,
Attorneys.

UNITED STATES PATENT OFFICE.

JOHN GEORGE PARVIN, OF LONDON, ENGLAND.

LIME-LIGHT APPARATUS.

SPECIFICATION forming part of Letters Patent No. 553,070, dated January 14, 1896.

Application filed January 8, 1894. Serial No. 496,061. (No model.)

*To all whom it may concern:*

Be it known that I, JOHN GEORGE PARVIN, a subject of the Queen of Great Britain, residing at 47 Whittingstall Road, Parson's Green, London, in the county of Middlesex, England, have invented certain new and useful Improvements in Lime-Light Apparatus, of which the following is a specification.

This invention has reference to lime-light apparatus for use in optical lanterns or for signaling or similar purposes where a steady brilliant light is required.

In ordinary lime-light apparatus two gases are used—oxygen and hydrogen; but when a saturator is used only one gas is needed—oxygen—part passing directly to the jet and the other part passing through the saturator and becoming saturated with the vapor of the ether, benzoline or other volatile fluid or hydrocarbon with which the apparatus is charged, the gas then passing to the jet and there mixing with the pure oxygen before emerging from the nipple of the jet.

Prior to my invention various forms of apparatus have been devised, but most of them have been attended with various drawbacks, such as the necessity of heating the vessel before use, unwieldiness, and imperfect construction or packing, causing explosions in the jet or chamber or difficulty of regulation.

With my apparatus no preliminary heating is necessary. It is compact, is used inside the lantern, and by its peculiar construction and packing explosions or "pops" are prevented.

In the accompanying drawings, which form a part of this specification, Figure 1 is a side elevation of an embodiment of my invention, partly in section. Fig. 2 is a plan view, also partly in section. Figs. 3 and 4 are enlarged sectional views of a T-piece and valves, and Fig. 5 is a view of a filler and cap for the saturator.

In carrying out my invention I construct the saturator of a double or multiple cylinder. $a$ is the outer cylinder, and $b$ the inner cylinder having small orifices $l$ at its bottom, the two cylinders being preferably formed in one casting so as to prevent any possibility of the gas to be saturated from passing over or through the top of the inner cylinder, the outer chamber $a$ being packed with cotton or asbestos wool $c$ or similar absorbent, and the inner chamber with asbestos cloth $d$ in sheets, layers, coils, or plates, being pressed tightly or hammered between a perforated disk of metal $f$ (which is prevented from passing or being forced to the top of the chamber by lugs or projections on the inner chamber) and a holding-ring $e$, which is sprung in after the necessary amount of packing has been inserted. The pipe which is attached to the jet $h$ is inserted and secured into the hole 1 and extends to the center of the saturator and is turned upward, as at 2. Below or it may be above this pipe $g$ is placed the perforated tube $k$ in the center of the outer chamber $a$. This tube extends up through the outer chamber, and is then bent round and down and attached to the left-hand arm of the T-piece $x$, the supply of gas to this tube being regulated by the screw-down valve $y$.

In order to form a firm support for the T-piece, a "dummy-tube" $k$ may be continued down to the base $j$, to which the generator is attached by screws $m$, entering piece $n$, soldered and fixed to the wall $a$ and $b$, or any other fluid-tight means of connection may be employed. The other tube $i\ i'$ is attached to the right-hand arm of the T-piece $x$, and extends downward into the base-plate $j$, thence along under the generator to the front, where it is connected to its continuation $i^2$ by screw-collar $i^3$, and finally into the jet or mixing chamber $h$. For the sake of appearance I prefer to arrange a dummy-tube $i^4$, Fig. 2, the tube $i$ being shown broken away at $i'$ in Fig. 1, extending from the T-piece to the top of the generator, similarly to the tube $k$, but it forms no passage for the gas. A screw-down valve $z$ regulates the admission of gas to this pipe $i$. I do not confine myself to the precise arrangement of the supply-pipes so long as one leads direct to the jet and the other enters the outer chamber of the generator. An opening is made in the top of the chamber for supply of the vaporizing fluid, closable by the thumb-screw filler $p$.

On the top of the generator I form, cast or attach a projection $q$, having a passage or slot $q'$ through it, through which a rod $r$ is passed, and to the forward end of which the lime-holder carrying the lime rod and cog-wheel $v$ is attached. The rear part of this rod is preferably of square section and screw-threaded, and passes through a similarly-shaped hole in a metal plate $r'$, which is secured to the two tubes $k$ and $i$. (See Fig. 2.) This rod $r$ carries a screw-threaded disk or washer $r^2$, spring $t$, and screw-threaded hand-nut $u$, by turning which the rod is caused to advance or recede, the spring $t$ being inclosed between the washer or disk $r^2$ and the bar $r'$, (or it may be a loose washer, as $r^3$ in Fig. 1,) thus having a tendency always to force the rod forward, the amount of movement of the rod $r$ being varied by altering the position of the nut $r^2$ upon the rod $r$. Through the rod $r$ the lime-turning pinion-rod $s$ passes, carrying the cog-wheel $v'$, which engages the cog-wheel $v$ in the usual manner to turn and raise or lower as desired. Screws $w$ are arranged on the base $j$ in order to raise or lower the generator, as desired.

The operation of the apparatus is as follows: Oxygen under pressure is conveyed by means of an india-rubber tube or other connection to the downwardly-extending arm of the T-piece $x$, and thence passes into the pipes $i$ and $k$, that in the pipe $i$ proceeding directly to the jet, while that in the pipe $k$ enters the outer chamber $a$ and issues from the perforated ring $k$, thence passing through the saturated material $c$ and entering the inner chamber in a thoroughly-saturated state by the orifices $l$, whence it passes upward through the tightly-packed asbestos $d$, by which it is filtered and strained from excess of moisture, finally issuing from the perforated plate $f$ into the top or dome of the inner chamber, whence it passes by the pipe $g$ to the jet of ordinary mixed-jet form of construction. By these means the gas is thoroughly saturated with the fluid or vapor and delivered to the jet in a practically dry state, any excess of fluid which it may have carried over from the outer chamber being strained away in its passage through the central chamber $d$.

Fig. 3 shows the arrangement of the oxygen-inlet ports, $x$ being the T-piece with the gas-passages leading to the pipes $k$ and $i$.

Fig. 4 shows the screw-down valve $y$, constructed preferably of steel, the inclined side of the point of which effects the opening and closing of the gas-supply—i.e., by acting upon the inlet from $x$ and the outlet to the pipe $i$—the valve $z$ being similar.

Fig. 5 shows a section of the form of filler which I prefer to use when pouring ether or other volatile fluid into the generator. It consists of a cup or funnel $p$ screwed into the top of the generator, and closable by a screwed top $p'$ which may contain a washer of gutta-percha, india-rubber or vulcanite, or soft metal, by means of which a secure and vapor-tight joint may be obtained.

Figure 1:
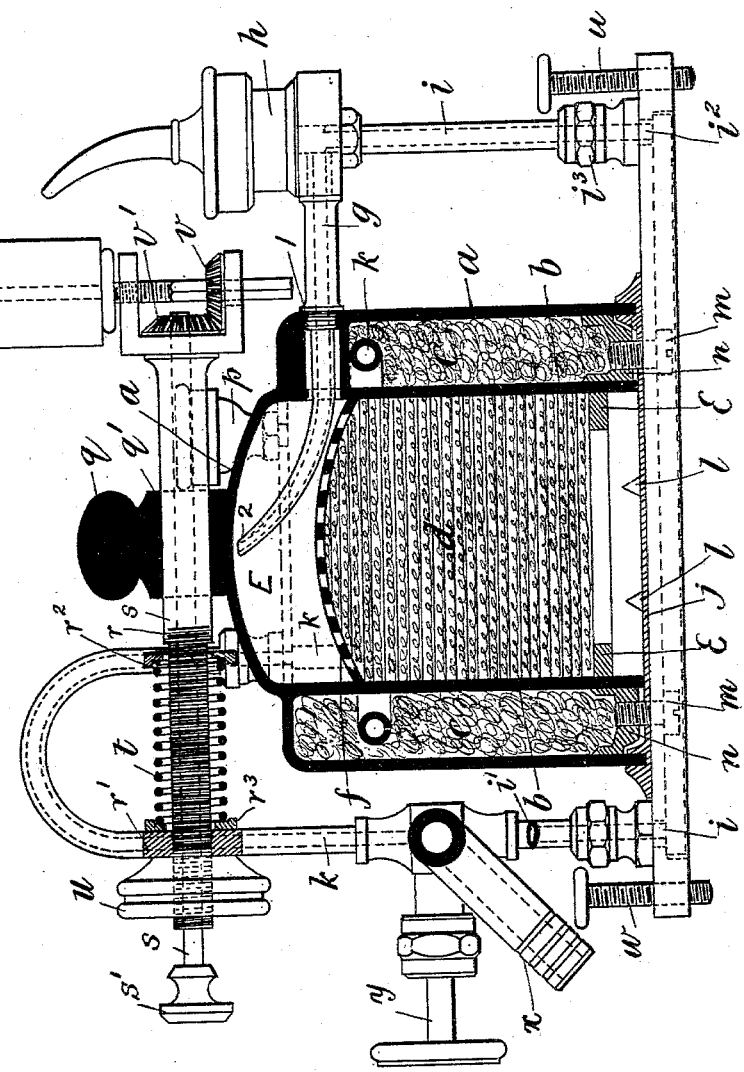

The heat generated by the incandescent lime is transmitted to the rod $r$, and through the rod to the projection $q$, which thus warms the top of chamber E and assists the vaporizing of the etherized oxygen.

The chamber E, when the generator is in use, collects the vaporized gas under compression, which keeps down the fluid ether, and also exerts an outward pressure in the pipe $g$, and prevents the flame at nozzle of jet from flying back into the chamber.

Even should the flame reach the chamber E the non-combustibility of the asbestos and the density of the packing $d$ would prevent its access to chamber $a$.

In using a closely-packed filling of non-combustible material in chamber $b$ a short delivery-pipe may be used with safety and the jet or burner thereby brought nearer to chamber $b$, so as the better to utilize the heat from the burner and with a more compact organization of the parts.

What I claim as my invention, and desire to secure by Letters Patent, is—

1. In lime light apparatus, the chamber $a$ having a packing of asbestos wool or other free absorbent, the chamber $b$ provided with a straining and retaining filling formed of closely packed non-combustible material, a support for the lime holder connected with chamber $b$ so that heat may be transmitted from the lime through said support to chamber $b$, the jet or burner arranged in close proximity to chamber $b$, and a short delivery pipe connecting chamber $b$ and the jet, substantially as set forth.

2. In lime light apparatus, the chamber $a$ having a packing of asbestos wool or other free absorbent, the chamber $b$ provided with a straining and retaining filling formed of non-combustible material, a support for the lime holder connected with the chamber $b$ so that heat may be transmitted from the lime through said support to chamber $b$, and a delivery pipe leading from said chamber, substantially as and for the purpose set forth.

3. In a lime light apparatus, the chamber $a$ having a packing of asbestos wool or other absorbent, the chamber $b$ provided with a straining and retaining filling formed of closely packed non-combustible material, a jet or burner arranged in close proximity to chamber $b$, and a short delivery pipe connecting chamber $b$ and the jet, substantially as set forth.

4. In lime light apparatus, a carburetor having the vapor chamber E, a delivery pipe 2 leading therefrom, and a support for the lime-holder connected immediately with the wall inclosing said space whereby heat may be transmitted from the lime through said support to the chamber E, substantially as set forth.

5. In a lime-holder for lime light apparatus, the hollow rod or tube $r$ having a part externally screw threaded, a stop or washer $r^2$ on said tube, bar $r'$ apertured to permit the threaded part of tube $r$ to pass therethrough without being turned, thumb nut $u$ threaded to engage the tube $r$, spring $t$ between the bar and washer, and the lime turning rod $s$ within tube $r$ having a pinion $v'$, substantially as described.

In witness whereof I, the said JOHN GEORGE PARVIN, have hereunto set my hand this 22d day of December, 1893.

JOHN GEORGE PARVIN.

Witnesses:
ERNEST DITTRICH,
DUDLEY WILLIAM BOOTY.